(12) United States Patent
Kuenkler

(10) Patent No.: US 6,286,783 B1
(45) Date of Patent: Sep. 11, 2001

(54) AIRCRAFT WITH A FUSELAGE SUBSTANTIALLY DESIGNED AS AN AERODYNAMIC LIFTING BODY

(76) Inventor: Hermann Kuenkler, Nussbaumweg 19, Ottobrun D-85521 (DE)

( * ) Notice: Subject to any disclaimer, the term of this patent is extended or adjusted under 35 U.S.C. 154(b) by 0 days.

(21) Appl. No.: 09/341,162

(22) PCT Filed: Jan. 2, 1998

(86) PCT No.: PCT/EP98/00015

§ 371 Date: Nov. 1, 1999

§ 102(e) Date: Nov. 1, 1999

(87) PCT Pub. No.: WO98/29303

PCT Pub. Date: Jul. 9, 1998

(30) Foreign Application Priority Data

Jan. 4, 1997 (DE) .............................................. 197 00 182

(51) Int. Cl.[7] .................. B64B 1/02; B64B 1/06; B64B 1/34; B64D 27/00; B64D 29/00; B64C 27/52

(52) U.S. Cl. ................. 244/30; 244/26; 244/56; 244/66

(58) Field of Search ................ 244/26, 30, 56, 244/66

(56) References Cited

U.S. PATENT DOCUMENTS

| 1,326,760 | | 12/1919 | Macinante | 244/26 |
|---|---|---|---|---|
| 3,567,157 | * | 3/1971 | Dancik | 244/7 R |
| 3,592,412 | * | 7/1971 | Glatfelter | 244/7 A |
| 3,633,849 | * | 1/1972 | Kling | 244/12.2 |
| 3,997,131 | * | 12/1976 | Kling | 244/23 |
| 4,591,112 | | 5/1986 | Piasecki et al. | 440/57 |
| 5,368,256 | * | 11/1994 | Kalisz et al. | 244/26 |
| 5,381,985 | * | 1/1995 | Wechsler et al. | 244/7 C |
| 5,383,627 | * | 1/1995 | Bundo | 244/26 |
| 5,449,129 | * | 9/1995 | Carlile et al. | 244/26 |
| 5,509,624 | * | 4/1996 | Takahashi | 244/115 |
| 5,516,065 | * | 5/1996 | Hagenlocher | 244/115 |
| 5,709,357 | * | 1/1998 | von Wilmowsky | 244/7 C |
| 5,823,468 | * | 10/1998 | Bothe | 244/2 |

FOREIGN PATENT DOCUMENTS

3729149A1    4/1989   (DE) .

* cited by examiner

Primary Examiner—Charles T. Jordan
Assistant Examiner—Christian M. Best
(74) Attorney, Agent, or Firm—Townsend and Townsend and Crew LLP

(57) ABSTRACT

An aircraft has a fuselage designed essentially as an aerostatic lift body. Combined lift and propulsion devices are articulated on the fuselage, are provided with propellers and form propulsion units and which in each case can tilt between a lift position, in which the respective propeller rotation plane is essentially horizontal and a propulsion position, in which the respective propeller rotation plane is essentially vertical. Additionally the propeller rotation plane has all-round inclination relative to the output shaft of the associated drive device.

37 Claims, 9 Drawing Sheets

AIRCRAFT WITH A FUSELAGE SUBSTANTIALLY DESIGNED AS AN AERODYNAMIC LIFTING BODY

The invention relates to an aircraft with a fuselage designed essentially as an aerostatic lift body and with combined lift and propulsion devices, which are articulated on the fuselage. These combined propulsion and lift devices are provided with propellers and form propulsion units, which in each case tilt between a lift position and a propulsion position. In the lift position the respective propeller rotation plane is essentially horizontal and the output shaft of the associated drive is essentially vertical. In the propulsion position, the respective propeller rotation plane is essentially vertical and the output shaft of the associated drive is essentially horizontal.

CROSS-REFERENCES TO RELATED APPLICATIONS

Applicant claims foreign priority from WO 98/29303 published Jul. 9, 1998 filed from German DE 19700182.3 filed Jan. 4, 1997.

BACKGROUND OF THE INVENTION

Aerostatic aircraft provided with translation propulsion systems have long been known, for example, as Zeppelins. These airships can take off and land essentially vertically by virtue of their aerostatic lift behavior, but, since they are predominantly lighter than air, they have to be restrained whenever they are held on the ground. Moreover, these aircraft are relatively sluggish to control, since, because of their slow speed and their small aerodynamic control surfaces, they have low control authority, that is to say high reaction inertia to control movements. Admittedly, airships have recently become known, which have main propulsion systems that tilt comparatively slowly about a transverse axis and laterally act as auxiliary propulsion systems for assisting the aerodynamic control. These propulsion systems reduce the turning circle of an airship, but it has not been possible for the airship to achieve "pinpoint" maneuverability. Another disadvantage of airships with an elongated streamlined body shape is their extremely high sensitivity to crosswind. In cross-winds it is necessary to restrain the airship on the ground in such a way that it can turn into the wind in the same way as a boat at a buoy. Anchor masts generally being necessary for this purpose.

Furthermore, vertical take-off aircraft are known, the engines of which are tilt out of a vertical lift position with a horizontal propeller rotation plane and a horizontal propulsion position with a vertical propeller rotation plane. One problem of these vertical take-off aircraft with tilting engines is the control of the gyroscopic forces which occur when the engines are tilted and which have to be supported via solid supporting structures on the aircraft wings and on the fuselage. On account of these gyroscopic forces, the tilting of the engines can take place only relatively slowly. These vertical take-off aircraft are likewise controlled essentially via aerodynamic control devices. Since, during the vertical take-off of these aircraft, the engines alone have to generate the lift of the aircraft as a whole, the load capable of being transported in addition to the aircraft's own weight is very limited.

SUMMARY OF THE INVENTION

The object of the present invention, therefore, is to provide a generic aircraft which combines the advantages of an aerostatic aircraft and the advantages of a vertical takeoff aircraft and which is therefore capable of transporting large loads over relatively long ranges. The aircraft can land, quickly and accurately, without a special infrastructure on the ground being required for this purpose.

This object is achieved in that the respective propeller rotation plane has all-around inclination relative to the output shaft of the associated drive, this output shaft acting on the propeller shaft.

This inclination of the propeller rotation plane, in addition to the fundamentally provided tilt of the propulsion system about a transverse axis, allows thrust vector control of the aircraft. This thrust vector control reacts quickly and giving the aircraft a very agile control behavior even during take-off and landing. This thrust vector control makes it possible (assuming sufficient propulsion system power) to land the aircraft provided with the aerostatic lift body with essentially pinpoint accuracy. This affords the advantage that the aircraft can descend directly on relatively small outside landing areas and can thus, for example, pick up a load in a factory yard and deposit it again directly with the recipient.

The inclination of the rotor plane takes place due to aerodynamic forces acting on the propeller blades, as the result of individual adjustment of the respective angle of incidence of the individual propeller blades. In this case, only the thrust vector for propulsion, lift, and control is introduced as a force into the fuselage. Reaction moments occurring during a rapid build-up of the thrust vector, for example gyroscopic moments of an associated engine or of the propeller, are supported on the surrounding air and not on the structure of the aircraft. In this way, the propeller plane also tilts relative to the output shaft very quickly in any direction over a large angular sector, without reaction forces which in this case originate from gyroscopic moments having to be transmitted to the fuselage. The angle of inclination of the propeller rotation plane relative to the output shaft of the associated drive, said output shaft acting on the propeller shaft, may amount to between ±20° and ±50°, preferably between ±25° and ±35° and, for further preference, ±30°. Since the thrust vector control of the aircraft according to the invention works both in the propulsion position and in the lift position of the propulsion units, complicated restraint of the aircraft on the ground is not necessary for short landing stops. With the propulsion systems still running, the rapidly reacting thrust vector control allows stabilization of the position of the aircraft on the landing area, even in the event of crosswind or gusts of wind. As a result, the aircraft according to the invention becomes independent of landing platforms or other landing equipment provided on the ground, such as, for example, anchors for securing restraining lines for the aircraft. It may nevertheless be necessary, particularly when the aircraft stops for longer periods during which the engines are switched off, to restrain the aircraft on the ground in the known way. This may be carried out by anchoring a landing foot preferably integrated on the underside of the aircraft, or by means of a rope winch system, which is integrated into the fuselage and which can be activated preferably centrally. The rapid-reaction thrust vector control of the aircraft according to the invention also makes it possible to pick up a load, and deposit it with pinpoint accuracy, from the hovering state of the aircraft, without the latter itself having to land.

In a particularly preferred embodiment of the aircraft according to the invention, the fuselage is designed at the same time as an aerodynamic lift body. As a result, during cruising, the fuselage can also generate an aerodynamic lift force in addition to the aerostatic lift.

In the aircraft according to the invention, actively actuated aerodynamic control devices dependent on the dynamic pressure in flight may be dispensed with. There is no need to provide any horizontal elevator or rudder units which would increase the crosswind sensitivity and gust sensitivity of the aircraft, even though they do not essentially cooperate in controlling the aircraft in flight at low speed in the take-off phase and the landing phase. For this reason, this control is performed solely by the thrust vector control. The aircraft may thereby be designed with a consistently simple shape.

If the fuselage has an essentially circular plan and because of the larger volume a substantially increased lift is achieved. This is to be compared with the cigar-like shape of an airship of conventional type, assuming the same length. This leads directly to a higher payload. Assuming the same volume as a cigar-like shape of an airship, the wetted surface of the outer skin of a fuselage having an essentially circular plan is reduced, thus leading to a weight reduction and diminishing the frictional drag. Moreover, crosswind sensitivity is thereby substantially reduced.

It is advantageous, at the same time, if the fuselage has an essentially elliptic cross section, with the result that the profile drag in horizontal flight is markedly reduced.

If the fuselage cross section is designed with an asymmetric, essentially elliptic shape, the upper part forming an upper shell which is curved to a greater extent than a lower shell forming the flatter lower part. During cruising, the fuselage also contributes, in the horizontal position, not only to the aerostatic lift, but additionally to an aerodynamic lift which replaces the rotor lift used during take-off and landing. Moreover, the different curvature leads to a more balanced structural load in the upper shell and the lower shell of the asymmetric discus-like fuselage.

Preferably, the fuselage has, in the equatorial region, at least one rim-like reinforcing ring. This reinforcing ring forms a horizontal stiffening of the fuselage, in that the reinforcing ring absorbs the radial forces of the upper shell and of the lower shell and additionally, for example, supports dynamic pressure forces impinging on the fuselage on the leading edge side.

At the same time, it is advantageous, in particular, if the reinforcing ring has, in cross section, a part-elliptic shape on its outer circumference. The reinforcing ring is thereby adapted, in cross section, to the shape of the fuselage cross section in the equatorial region.

The embodiment is also advantageous where the reinforcing ring has a composite fiber material, preferably of the sandwich type. This achieves, along with high strength and low weight, a desired elasticity, which allows the reinforcing ring to experience deformation within predetermined limits. By virtue of this elastic deformation, forces and moments introduced into the reinforcing ring from a propulsion support structure can be taken over and transferred by the fuselage envelope structure. The largest possible lever arms and the natural dimensional rigidity of the pressurized elliptic discus-like fuselage, is particularly suitable for this force and moment take over and transfer purpose. The main function of the rim-like reinforcing ring is to absorb the radial forces from the envelope structure for the purpose of the horizontal stiffening of the discus-like fuselage.

It is advantageous for the resultant compression loads to be absorbed by two compression-resistant supporting profiles with high specific compressive strength, which are integrated into the reinforcing ring and to which preferably also the support structure of the upper shell and of the lower shell of the fuselage is anchored.

In order to limit the desired radial elasticity, the reinforcing ring may have at least one supporting skeleton, which is advantageously designed as a framework. This framework, in cross section, is preferably of essentially triangular design, two of the corners being formed by the supporting profiles integrated into the reinforcing ring, and the vertex of the triangle pointing toward the inside of the fuselage.

It is advantageous if the supporting skeleton is integrated at least partially into the reinforcing ring.

According to a further advantageous embodiment of the invention, in each case, two propulsion units are jointly mounted in a supporting structure preferably attached non-rigidly to the fuselage., Bending moments, which result, during the take-off and landing phases, from the lifting thrust of the individual propulsion system and the projecting attachment of the propeller axis, can be guided directly from one propulsion unit to the other. These forces do not have to be transmitted through the entire fuselage structure. The two propulsion units are thus supported relative to one another via their common supporting structure.

The respective propulsion units and/or their supporting structures together with the propulsion units assigned to them arc preferably coupled non-rigidly to one another via thrust struts, to form a propulsion support frame which twists and distorts as a result of these non-rigid connections.

Preferably, the propulsion units and/or their supporting structures are attached non-rigidly to the rim-like reinforcing ring. The propulsion units are thereby integrated into the propulsion support frame, which is attached non-rigidly to the rim-like reinforcing ring. This embodiment ensures that the forces emanating from the individual propulsion units are largely transferred via the propulsion support frame. The reinforcing ring and the fuselage envelope structure are relieved of the transfer of these forces. In addition, vibration uncoupling is assisted thereby.

If the front propulsion units and the rear propulsion units are in each case located at a different distance from the longitudinal center plane, this ensures that the rear propulsion units do not lie in the vortex trail of the front propulsion units.

Additionally or alternatively to this, the front and rear propulsion units may also be arranged at different heights on the aircraft, in order to achieve the same or a more improved effect in this respect.

In a particularly preferred design of the invention, the aircraft is provided with four propulsion units which, for further preference, are in each case provided in pairs on a supporting structure. Advantageously, in each case, a propulsion unit is provided in the region of one corner of an imaginary quadrangle (or another polygon, depending on the number of propulsion units) which surrounds or partially penetrates the circular plan of the aircraft.

Preferably, two engines capable of being operated in parallel with one another are provided in each propulsion unit.

Redundancy is thereby achieved within each individual propulsion unit, and, even if an engine of a propulsion unit fails, this redundancy also allows the propulsion unit as a whole to operate reliably, with only a slight overall loss of thrust. The operating safety of the aircraft is thereby increased, since the risk of a complete failure of an entire propulsion unit is greatly reduced because of the duplication of the engines. The arrangement of four twin-engine propulsion units of this type gives full propulsion redundancy, even if an engine were to fail during take-off with a maximum take-off mass, that is to say in vertical flight. If a complete propulsion unit fails during take-off, only two propulsion units located diagonally opposite one another provide lift. In the case of a maximum take-off mass, this makes it possible to maintain an insignificant descent speed. The third operational propulsion unit can be used for stabilizing the aircraft about the roll axis and about the pitch axis. If, in the case of such a loss of propulsion, a sufficient flight altitude has already been reached, a transition to cruising can be carried out. During cruising, the aircraft provided with four propulsion units remains fully airworthy and maneuverable. If a propulsion unit fails completely, it is ensured that there is still one propulsion unit operational on each side of the aircraft with respect to the longitudinal center plane, the third operational propulsion unit also being used for regulating the flight attitude.

A cargo compartment for the transport of cargo is preferably designed in the lower region of the fuselage, below which cargo compartment a landing foot preferably of platform-like design can be extended.

In an advantageous embodiment, the cargo compartment is provided with at least one ramp, and preferably two ramps can be provided on two sides facing away from one another. The provision of one ramp makes it easier for the aircraft to be loaded and unloaded and the provision of two ramps located on sides facing away from one another allows more rapid loading and unloading in the so-called RORO mode (roll-on/roll-off).

A pneumatically extendable bellows-like annular bead is provided, directed downward, as a landing foot below the cargo compartment in the region of the circumference of the cargo compartment. Landing impact can be cushioned by this landing foot. Further, because of the low specific surface pressure, landing on unconsolidated ground may also take place. In order to set a specific height, the pneumatically extendable annular bead has integrated height limitation.

In another embodiment of the aircraft according to the invention, a passenger cabin, preferably having a two-story design in places, is provided in the front part of the equatorial region of the fuselage, so that the aircraft can be used as a means of passenger transport.

Preferably, in this case, the passenger cabin is suspended in the rim-like reinforcing ring and preferably also in the front supporting structure of the propulsion support frame.

In a preferred embodiment, a baggage and freight compartment is provided in the rear part of the equatorial region of the fuselage. This arrangement of the baggage and freight compartment in the rear part of the aircraft ensures, together with the passenger cabin provided in the front part of the aircraft, that the basic trim of the aircraft is as balanced as possible.

Preferably, the baggage and freight compartment is suspended in the rim-like reinforcing ring and preferably also in the rear supporting structure of the propulsion support frame.

In an advantageous development, there is provided in the lower shell a central body, which is integrated into the lower shell. This body preferably has on the underside a bellows-like pneumatically extendable annular bead designed as a landing foot.

The central body is suspended in the envelope structure of the fuselage, the envelope structure being formed by the upper shell and by the lower shell, in such a way that, in the event of a hard landing, said central body can spring upward. This makes it possible to cushion the passenger cabin, baggage and freight compartment and propulsion support frame. Landing impacts are kept away from the passenger cabin and consequently from the passengers and also from the baggage and freight compartment and the propulsion support frame.

Preferably, the central body is provided with at least one ramp for access from outside.

If the passenger cabin and the baggage and freight compartment are connected to the central body via encased transport links, then connecting passages screened off from the surrounding fuselage interior are produced between the central body and the passenger cabin as well as the baggage and freight compartment. If the connection between the transport links and the central body is of non-rigid design, the springing of the central body becomes possible. In this case, at least two, preferably three transport links may be provided.

In a further preferred embodiment, the fuselage has a support structure and a fuselage envelope, the fuselage envelope being optionally heated, at least in portions, in the region of the upper shell. This heating, in particular on that side of the upper shell which faces the inside of the fuselage, causes the fuselage envelope to be deiced. Operating safety of the aircraft in use during bad weather is appreciably increased.

Advantageously, the optionally heated portions of the fuselage envelope may be of double-walled design and have flowing through them, as required, warm air or another gas which is warmer than the fuselage surroundings. For this purpose, either the waste heat of the engines may be used or additional independent heating devices may be provided. It is also advantageous if the pressure within the fuselage envelope is capable of being modulated. This embodiment assists effective deicing of the fuselage envelope and is consequently conducive to the aircraft operating safely in bad weather.

In another particularly preferred embodiment of the aircraft, central control, preferably of the digital variety, is provided. This central control, either individual or collective, controls the angles of incidence of propeller blades of all propulsion units. This enables exclusive attitude control and flight control in the vertical take-off and landing mode, in the horizontal cruising mode and in the transitional mode between these two operating conditions. This central control ensures a stable flight behavior, which is guaranteed at all the operating conditions of the aircraft and thus relieves the pilots of this task.

Additional manual flight control may be provided as redundancy for this central control, this manual flight control enabling the pilot to stabilize the flight behavior of the aircraft in the event of a failure of central control.

Thrust vector control in the aircraft is provided by a propulsion unit having at least one propeller. The propeller rotation plane is designed to be inclined relative to the drive output shaft acting on the propeller shaft. The rotational movement of the propeller is achieved in that the propeller shaft and the drive output shaft acting on the propeller shaft are connected to one another in an articulated manner, preferably via a double cardan joint or a synchronous joint. This embodiment of the propulsion unit additionally achieves, independently of the tilting state of the propeller rotation plane between the lift position and the propulsion position, all-round effective inclination of the propeller rotation plane in the form of an imaginary disk. This allows a rapid and immediately effective change in the thrust vector. This special embodiment of a propulsion unit, with a propeller rotation plane having inclination all-round relative to the drive output shaft, can be used not only on the aircraft described in this application, but for aircraft in general. This can be used also for vessels, when the effective direction of a thrust vector emanating from a rotating propulsion unit is to be changed quickly.

For practical use, preferably in aircraft, in addition to the primary suitability for use in the highly agile thrust vector control of propeller propulsion units, there are the following advantages:

The propeller plane can in each case be oriented perpendicularly to the air flow direction, irrespective of the attitude or aircraft position.

In the case of the approach of a crosswind, a compensating trimming thrust component can be built up.

Even when the air flow direction is oblique to the propeller plane, no bending moment acts on the propeller shaft, since the build-up of a tilting moment of the propeller plane is eliminated by means of the cyclically individual blade setting.

It is advantageous, at the same time, if the hub of the propeller is mounted via a cardan ring, with the result that the propeller rotation plane inclination makes thrust vector control possible is achieved.

In a preferred development of this propulsion unit, the propeller blades are arranged on an associated propeller hub without flapping hinges and without lag hinges or other elastic parts acting in an equivalent way to these.

In this case, the angle of incidence of the individual propeller blades is adjustable, preferably by means of a swash-plate, collectively as well as individually variably relative to the inclination of the propeller rotation plane. This arrangement of the propeller blades and the control of their angles of incidence via a swash-plate brings about an inclination of the propeller rotation plane which directly follows the change in the angle of incidence of the propeller blades (pitch change). The result is that the desired thrust vector change for controlling the aircraft can be achieved.

In this case, the cyclic change in the blade angles of incidence takes place via the swash-plate, as in the case of the helicopter rotor. In contrast, however, the blade roots of the propeller blades do not have to continue to be adjusted cyclically after the conclusion of the dynamic operation of tilting the propeller plane into a plane perpendicular to the air flow direction. This is in contrast to the rotor hub fixed to the helicopter, where the propeller hub has been tilted jointly with the propeller rotation plane relative to the output shaft. In this embodiment of the subject of the invention, the swash-plate, the propeller hub and the propeller blades rotate in planes parallel to one another again after the tilting operation.

Admittedly, in principle, the angle of inclination of the propeller rotation plane relative to the output shaft of the associated drive, said output shaft acting on the propeller shaft, may amount to between ±20° and ±50°, preferably between ±25° and ±35° and, for further preference, ±30°, as has already been stated. However, if the angle of inclination of the propeller rotation plane relative to the output shaft of the associated drive amounts up to more than ±45°, then both a lift position and a propulsion position can be set solely by inclining the propeller rotation plane.

Preferably, however, a tilting mechanism for mounting the propulsion unit on a craft is provided, said tilting mechanism allowing the propulsion unit to tilt about a tilting axis between a lift position, in which the output shaft is oriented essentially vertically, and a propulsion position, in which the output shaft is oriented essentially horizontally. During the transitional phases, that is to say, for example, in the case of the aircraft, the respective transitional phases between vertical flight and horizontal flight, this tilting is likewise induced by the individual control of the angles of incidence of the propeller blades via fluid-dynamic forces. This causes the output axis of the propulsion system to tilt about the tilting axis, for example an axis parallel to the transverse axis of the aircraft.

Preferably, a tracking device is provided, which follows a tilting movement of the propulsion unit, in particular the propeller rotation plane, occurring due to fluid-dynamic forces acting on the propeller and to resultant gyroscopic forces, and which assists this tilting movement, preferably without any reaction force. This tracking device follows, with a markedly lowered adjusting speed (approximately the factor 5), the tilting movement of the propeller rotation plane. The tilting movement of the propeller rotation plane commences due to the fluid-dynamic forces acting on the propeller (these are aerodynamic forces in use on an aircraft) and due to the resultant gyroscopic forces.

In an alternative embodiment, the propeller hub is mounted in a uniaxial inclination joint, the inclination axis of which runs perpendicular to the tilting axis of the propulsion unit. The inclination of the propeller hub about the inclination axis, together with the tilt of the propulsion unit about the tilting axis of the propulsion unit, allows the propeller rotation plane to be inclined in all directions. Adjusting speed of the tracking device for the tilting movement about the tilting axis of the propulsion unit essentially corresponds to the adjusted speed of the fluid-dynamically induced inclining movement of the propeller rotation plane. This achieves a tilting movement essentially free of reaction force. The cardan mounting, specified above, of the propeller hub may be dispensed with in this design.

In a preferred development, there is integrated into the propeller hub a reduction gear which is preferably designed in the manner of a planetary gear and is acted upon rotationally by the output shaft of the drive, preferably via the double cardan joint or the synchronous joint. This transmits and reduces the rotational speed of the output shaft to the propeller hub. The double cardan joint or the synchronous joint for the propeller drive is thereby relieved of very high moments, which may occur, in particular, during operation with a propeller of large diameter.

This embodiment of the propulsion unit according to the invention, because of its propeller rotation plane inclination caused by the variable-pitch setting of the angle of incidence of the rotor blades, ensures that the propeller rotation plane is deflected out of its current position without any reaction force. Consequently, the thrust vector is changed without any reaction force. In this embodiment, therefore, no gyroscopic moments have to be supported on the fuselage, so that complicated and heavy supporting structures and corresponding reinforcements in the fuselage may also be dispensed with, even when rapid thrust vector changes are required for agile flight control and attitude control.

The invention relates, furthermore, to a method for controlling an aircraft having a propeller propulsion system, the angle of incidence of the individual propeller blades of each propeller being individually cyclically set. At the same time, the propeller rotation plane can be inclined without any reaction force, the inclination being induced by resulting aerodynamic forces and by resulting gyroscopic forces. This method allows the rapid-reaction control of a propeller aircraft, which as a result, particularly in the low flying speed range, allows more rapid changes in direction than with the conventional aerodynamic control via elevators, rudders and ailerons.

BRIEF DESCRIPTION OF THE DRAWINGS

The invention is explained in more detail below by means of an example, with reference to the drawing in which.

DETAILED DESCRIPTION OF THE INVENTION

Figure 1:
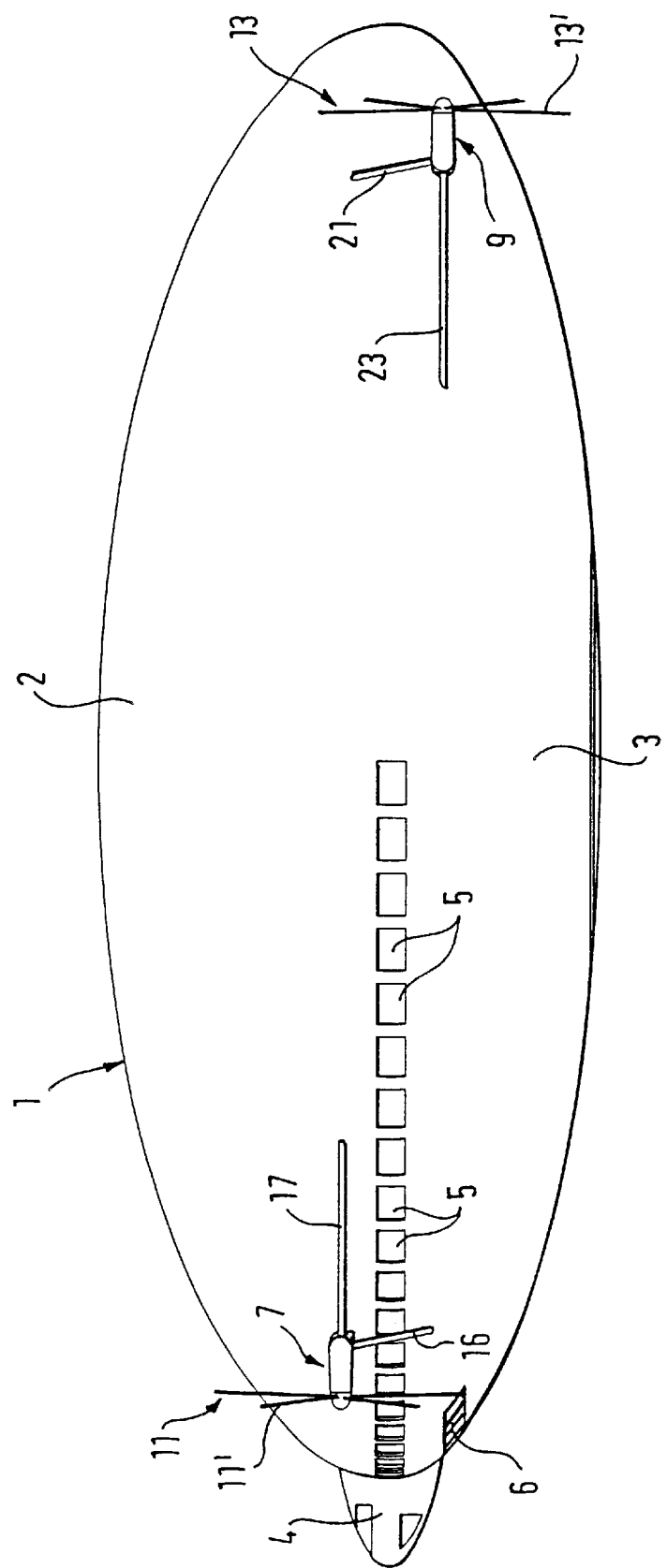
FIG. 1 shows an aircraft according to the invention in a passenger transport version in the cruising flight condition.

FIG. 1 shows a side view of a passenger transport version of an aircraft according to the invention in the cruising flight condition. The aircraft possesses a fuselage 1 which is designed essentially as an aerostatic lift body and which is filled predominantly with a gas, which is lighter than air. This gas is preferably helium.

The fuselage 1 is designed as an ellipsoid of revolution and thus has an essentially circular plan and an elliptic cross section. That part of the fuselage 1 which is upper with respect to the equatorial plane of the fuselage 1 and is termed the upper shell 2. It is curved to a greater extent than the lower part of the fuselage 1 which is located below the equatorial plane and is termed the lower shell 3. This shell is of substantially flatter design and therefore has a smaller height than the upper shell 2.

Figure 2:
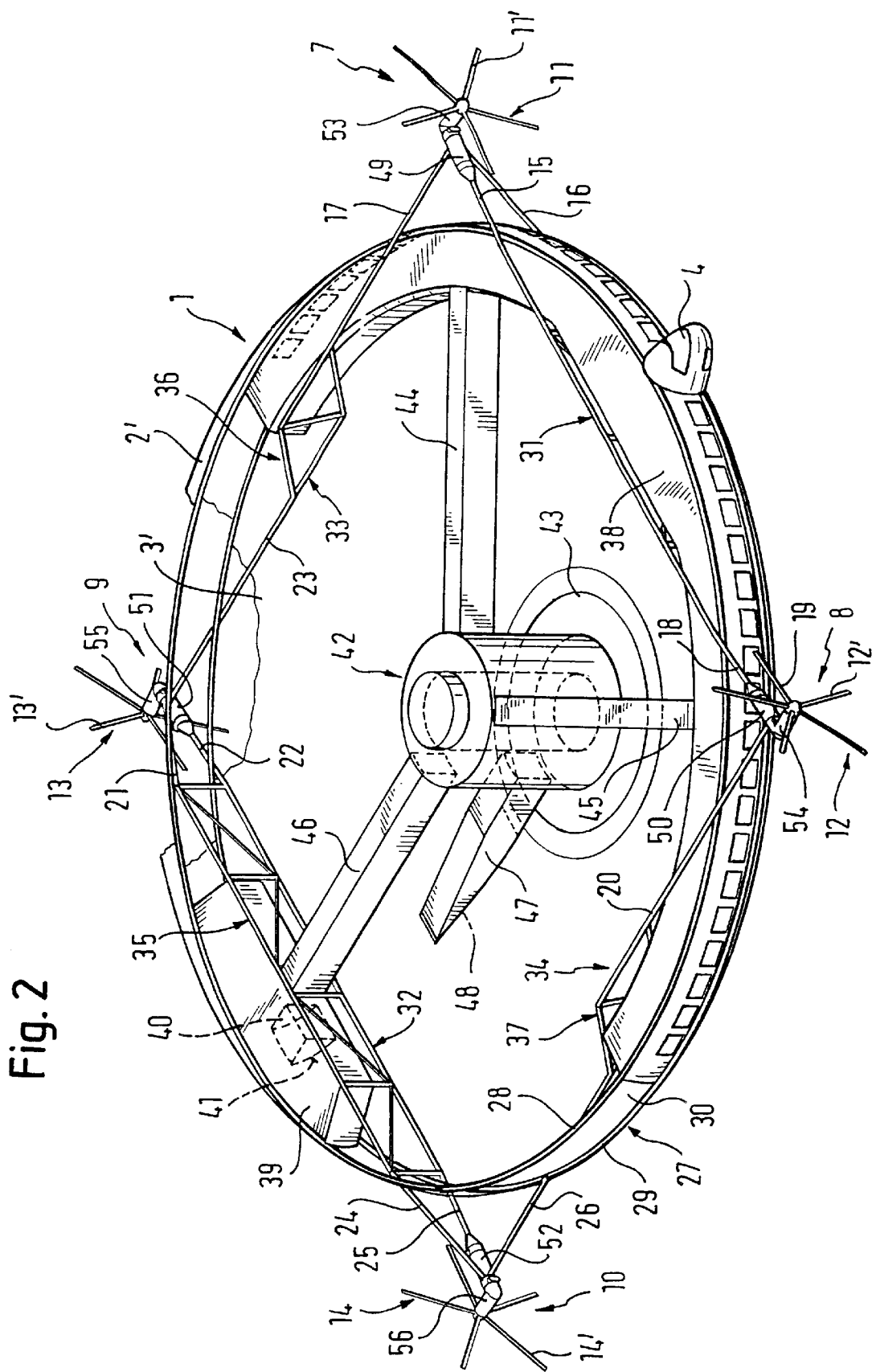
FIG. 2 shows an isometric sectional view of an aircraft according to the invention in a passenger transport version.

Although the fuselage 1 is of circular design, as seen in a plan view, it possesses a defined front side. This defined front side is in the direction of flight, with the front side being determined by a cockpit extension 4 which is attached in a nose-like manner at a location on the equatorial circumference of the fuselage 1. The front half of the equatorial circumference of the fuselage 1 is provided with windows 5, formed in the fuselage wall, of the upper story of a two-story passenger cabin 38 (FIG. 2). Another row of windows of the lower story, which are designed as panorama windows 6, is arranged in the foremost region of the fuselage 1 below the cockpit extension 4 and laterally of the latter. Two front propulsion units 7, 8 and two rear propulsion units 9, 10 are arranged laterally of the fuselage 1.

The front propulsion units 7, 8 are in each case provided with a propeller 11, 12. The propellers are directed forward in the direction of flight and are designed as a traction propeller. The propeller blades 11', 12' are designed in the same way as propeller blades of a conventional aircraft airscrew. The propeller diameter is in the region of the diameter of helicopter rotors.

The rear propulsion units 9, 10 possess a propeller 13, 14 which points rearward with respect to the direction of flight and which are designed as pusher propellers. The propeller blades 13', 14' of the rear propulsion units 9, 10 are likewise designed in an airscrew-like manner and the diameter of the rear propellers 13, 14 corresponds approximately to the diameter of the front propellers 11, 12.

The front propulsion units 7, 8 are attached to the fuselage via respective transverse links 15, 16 and 18, 19 and longitudinal links 17 and 20.

The rear propulsion units 9, 10 are attached to the fuselage via respective transverse links 21, 22 and 24, 25 and respective longitudinal links 23 and 26.

The front propulsion units 7, 8 are located above the equatorial plane of the fuselage 1 and the rear propulsion units 9, 10 are located below the equatorial plane of said fuselage.

FIG. 2 is an isometric sectional view of an aircraft according to the invention in a passenger transport version, the fuselage envelope 2' of the upper shell 2 being for the most part cutaway and the fuselage envelope 3' of the lower shell 3 being cutaway in the region of the rear left propulsion unit 9.

Provided in the equatorial region of the fuselage 1 is a rim-like reinforcing ring 27 which has a continuous compression-resistant supporting profile 28, 29 in each case at its upper edge and at its lower edge. Between the continuous supporting profiles 28, 29 is provided an annular wall 30 which connects the upper supporting profile 28 and the lower supporting profile 29 to one another. The design of the reinforcing ring 27 is described in detail further below with reference to FIG. 7.

The front propulsion units 7, 8 are connected to one another via a framework-like front supporting structure 31, the front upper transverse links 15, 18 and the front lower transverse links 16, 19 forming elements of the front supporting structure 31.

The rear propulsion units 9, 10 are connected to one another via a rear supporting structure 32, the rear transverse links 21, 22, 24, 25 forming elements of the rear supporting structure 32.

The front longitudinal links 17, 20 of each side of the aircraft are connected to the rear longitudinal links 23, 26 of the same side, a framework-like structure 33, 34 being provided in the region of the respective connection point, in order to compensate for the different heights of the propulsion units and, consequently, of their longitudinal links.

The longitudinal links 17, 23 and 20, 26, together with their associated framework-like connecting structures 33 and 34, form in each case a left thrust strut 36 and a right thrust strut 37.

The front supporting structure 31, the rear supporting structure 32, the left front longitudinal link 17, the left rear longitudinal link 23, their left framework-like connecting structure 33; the right front longitudinal link 20, the right rear longitudinal link 26 and their right framework-like connecting structure 24 together form a propulsion support frame 35 which connects the four propulsion units 7, 8, 9 and 10 to one another. The respective longitudinal links 17, 23, 20, 26 being connected non-rigidly to the associated supporting structures 31, 32, in order to make it possible for the propulsion support frame to be distorted and twisted.

The propulsion support frame 35 is suspended non-rigidly on the rim-like reinforcing ring 27 in the region of the front and rear supporting structures 31, 32 and of the left and right thrust struts 36, 37. This allows distortion between the propulsion support frame 35 and the rim-like reinforcing ring 27.

Provided in the front part of the fuselage 1 is a semi-annular passenger cabin 38 which is suspended on the rim-like reinforcing ring 27 and on the propulsion support frame 35, in particular on the front supporting structure 31 of the latter. The windows 5 of the passenger cabin 38 are formed in the front part of the reinforcing ring 27 in the annular wall of the latter.

A baggage and freight compartment 39 for freight and the passengers' baggage is provided in the rear part of the fuselage 1. The baggage and freight compartment 39 is suspended on the reinforcing ring 27 and on the rear supporting structure 32. The baggage and freight compartment 39 is provided on its underside with a well 40 which leads from the bottom of the baggage and freight compartment 39 to the wall of the lower shell 3. The well 40 is capable of being closed on its underside by a flap 41 mounted in the wall of the lower shell 3. A rope assembly or elevator, not illustrated in FIG. 2, is provided in the baggage and freight compartment 39 in the region of the well 40. This permits freight to be lowered from the baggage and freight compartment 39 to the surface of a landing area or to transport freight from there into the aircraft.

Provided in the middle of the fuselage is a cylindrical central body 42 which stands on a landing foot 43 formed on the underside of the lower shell 3 and which is connected via encased transport links 44, 45, 46 to the passenger cabin 38 and to the baggage and freight compartment 39. The central body 42 extends at least into the region of the equatorial plane or slightly beyond this, although a clear vertical distance between the topside of the central body 42 and the wall of the upper shell 2 is provided. The central body 42 is suspended in the envelope structure of the fuselage 1, the envelope structure being formed by the upper shell 2, lower shell 3 and reinforcing ring 27. These are joined, in such a way that, in the event of a hard landing of the aircraft, said central body can spring upward. This makes possible cushioning of the passenger cabin 38, baggage and freight compartment 39 and drive carrier frame 35, the transport links 44, 45, 46 also being connected non-rigidly to the central body 42, in order to allow the latter to exert a springing action.

Provided in the lower region of the lower shell 3 is an encased corridor 47 which leads radially outward from the central body 42 to the wall or envelope 3' of the lower shell 3 and which is capable of being closed by an access ramp 48 formed in the wall of the lower shell 3. Within the central body 42 are provided stairs and/or hoists which connect the lower boarding region of the central body 42 level with the corridor 47 to the upper region giving access to the transport links 44, 45, 46.

It can also be seen in FIG. 2 that the propulsion units 7, 8, 9, 10 are of angled design, in each case an engine 49, 50, 51, 52 being arranged transversely to the aircraft longitudinal center plane running through the central body and the cockpit extension, said engine preferably lying horizontally. At the same time, the front engines 49, 50 are oriented coaxially to the respective front upper transverse links 15 and 18, whilst the rear engines 51, 52 are oriented coaxially to the respectively associated rear lower transverse links 22 and 25. The axes of the engines 49, 50, 51, 52 therefore lie in a plane parallel to the equatorial plane of the aircraft.

Each of the engines 49, 50, 51, 52 is connected to a front portion 53, 54 or a rear portion 55, 56, respectively, of the associated propulsion unit via an angular gear, not shown in the figures. The respective input shaft is connected to the driven shaft of the associated engine and of which the output shaft acting on the respective propeller is located in a plane running at right angles to the axis of rotation of the respective engine. In the illustration in FIG. 2, moreover, the output shafts lie horizontally. The presence of the angular gear in each propulsion unit 7, 8, 9, 10 is apparent from the angled design of the propulsion units 7, 8, 9, 10 which is illustrated in FIG. 2.

Each propulsion unit 7, 8, 9, 10 is mounted for rotation about the axis of rotation of its associated engine 49, 50, 51, 52. This mounting for rotation has the respective front portion 53, 54 of the front propulsion units 7, 8 lying horizontally in FIG. 2, and the rear portion 55, 56 of the respective rear propulsion unit 9, 10 lying horizontally in FIG. 2. In each case the associated output shaft of the drive, can be tilted between the horizontal orientation illustrated in FIG. 2 and a vertical orientation.

Figure 3:
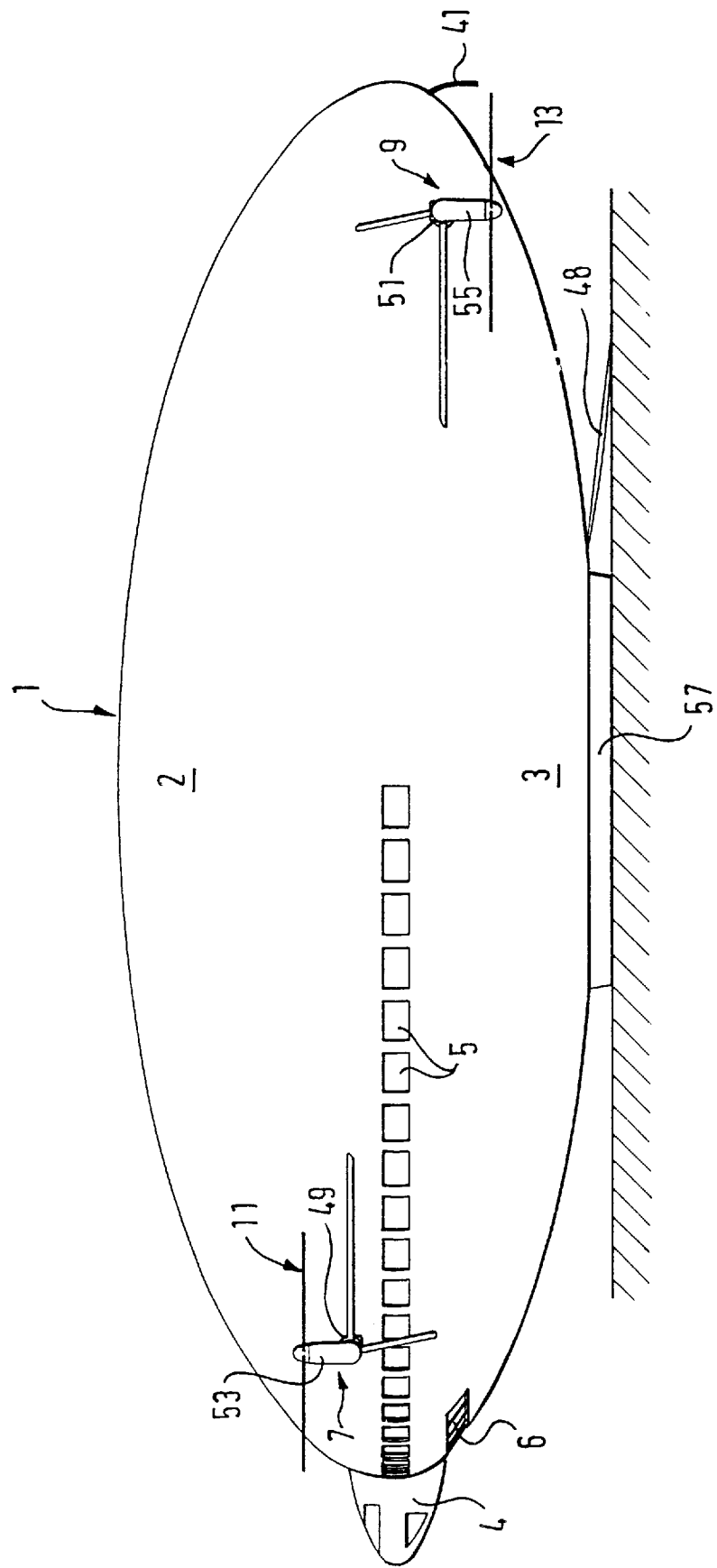
FIG. 3 shows an aircraft according to the invention in a passenger transport version in the landing condition on unprepared ground.

FIG. 3 illustrates the aircraft in a side view in the landed state, in which the portions 53, 54, 55, 56 of the propulsion units 7, 8, 9, 10, in which portions the respective output shaft is located, are tilted into the vertical. The respective propeller rotation plane of the propulsion units 7, 8, 9, 10 therefore runs horizontally in FIG. 3, and FIG. 3 therefore also at the same time shows the take-off and landing position of the propulsion units.

The opened flap 41 of the baggage and freight compartment 39 and the lowered access ramp 48 of the corridor 47 to the central body 42 are also apparent in FIG. 3. There can be seen below the lower shell 3 of the fuselage 1 a bellows-like annular bead 57 which is extended downward from the lower wall of the lower shell 3 and on which the landed aircraft rests, the annular bead 57 serving as a landing foot.

It can also be seen in FIG. 3, the front propulsion unit 7 and also the front propulsion unit 8, not shown, are tilted upward relative to the cruising position illustrated in FIG. 1. The plane of the propeller 11 is located above the associated engine 49, and the plane of the propeller 13 of the rear propulsion unit 9, and of the rear propulsion unit 10 which cannot be seen, lies below the associated engine 51. This different position of the respective propeller plane is brought about because the front propellers are traction propellers and the rear propellers are pusher propellers. By means of the arrangement shown in FIG. 3, both the front propulsion units and the rear propulsion units can generate an upwardly directed thrust.

Figure 4:
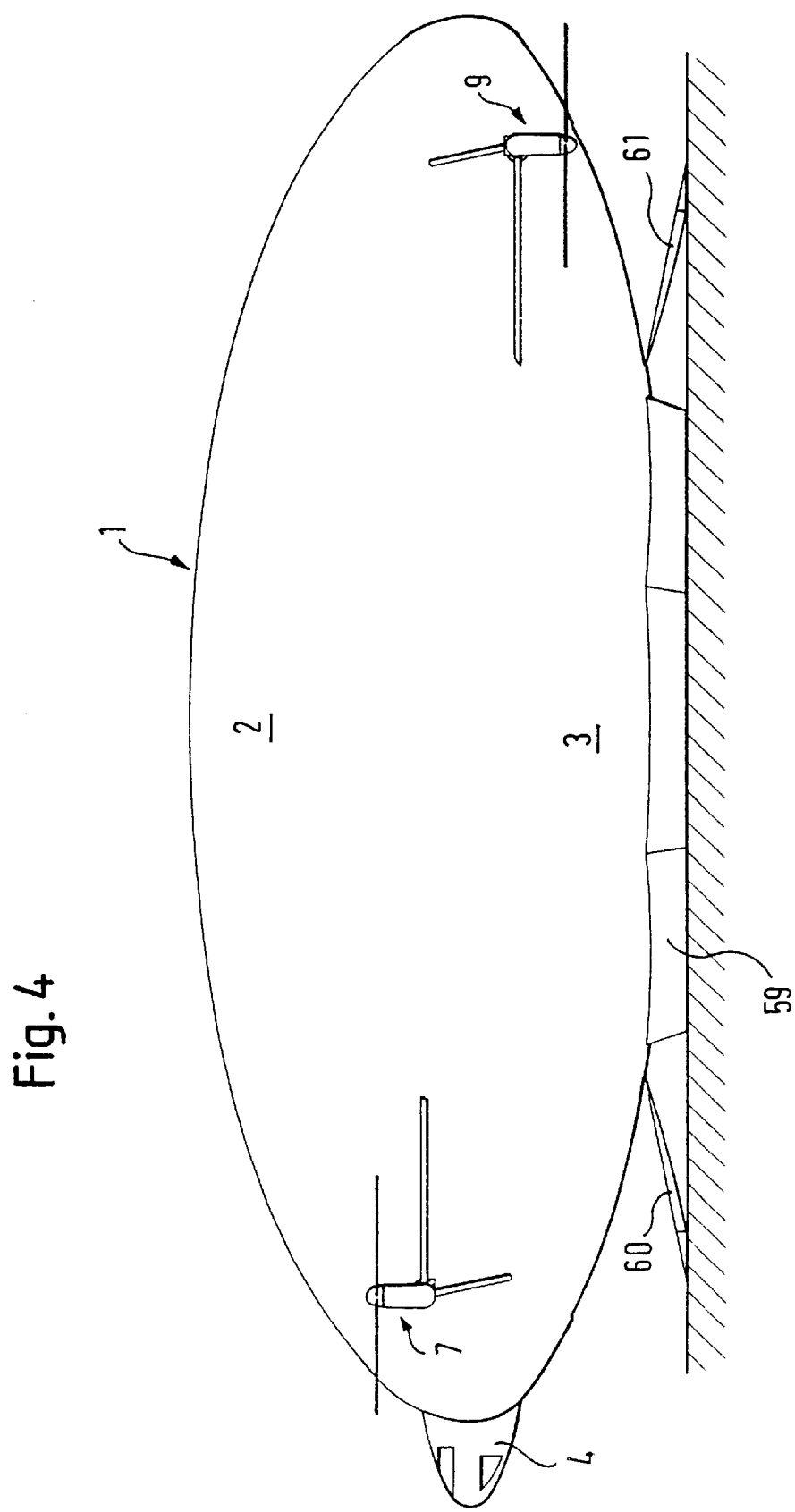
FIG. 4 shows an aircraft according to the invention in a cargo transport version in the landing condition on unprepared ground.

FIG. 4 shows an embodiment of the aircraft according to the invention, designed as a cargo transport version, in the same operating condition as that in FIG. 3 for the passenger transport version. In this cargo transport version, the windows 5 and 6 in the fuselage 1, which are provided in the passenger transport version, are absent. Instead, the lower shell 3 has formed in it a cargo compartment 58 (FIG. 5), illustrated in FIG. 5, which is essentially octagonal, as seen in a plan view, and which is provided, below its bottom, with a bellows-like annular bead 59. This bellows-like annular bead 59 is adapted to the plan contour and is directed downward, and functions as a landing foot in the same way as the annular bead 57 in the passenger transport version. It delimits a larger base area, adapted to the plan contour of the cargo compartment, than the annular bead 57 of the passenger transport version.

Furthermore, in the cargo transport version shown in FIG. 4, a front ramp 60 and a rear ramp 61 are provided in the wall of the lower shell 3, which lead respectively from the front and from the rear through a front corridor 62 and a rear corridor 63 to the cargo compartment 58 (FIG. 5) and which make it easier for the cargo compartment 58 to be loaded and unloaded simultaneously.

Figure 5:
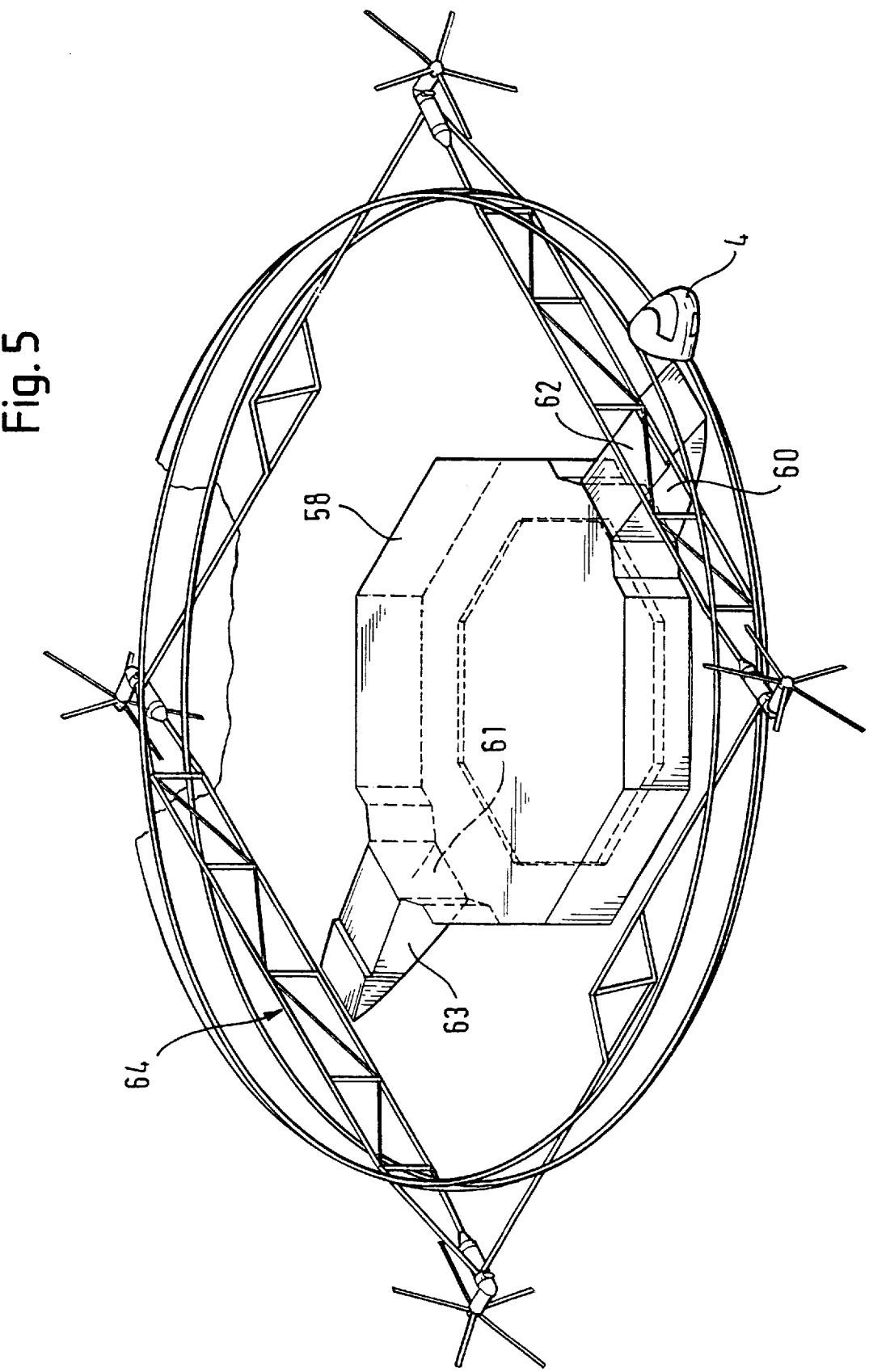
FIG. 5 shows an isometric sectional view of an aircraft according to the invention in a cargo transport version.

FIG. 5 reproduces an isometric view of the cargo transport version, shown partly in section, of the aircraft according to the invention, the view of FIG. 5 corresponding basically to the view of the passenger transport version in FIG. 2. In this version, the design of the propulsion support frame 64 also corresponds basically to the propulsion support frame 35 of the passenger transport version. The fuselage 1, together with the upper shell 2 and lower shell 3 and the rim-like reinforcing ring 27, also corresponds basically to the passenger transport version illustrated in FIG. 2. In order to avoid repetition, therefore, reference is made to the description of FIG. 2 where the description of these essentially identically designed structural elements and of the essentially identically designed propulsion units is concerned. The cargo compartment 58 is located essentially in the region of the lower shell 3 of the fuselage 1 and the upper wall of the cargo compartment 58 is at a clear distance from the upper wall of the upper shell 2. This makes possible the cargo compartment 58 to have a springing effect. This allows the propulsion support frame 64 to be cushioned. The height of the cargo compartment 58 is, at most, about one quarter of the total height of the aircraft.

Figure 6:
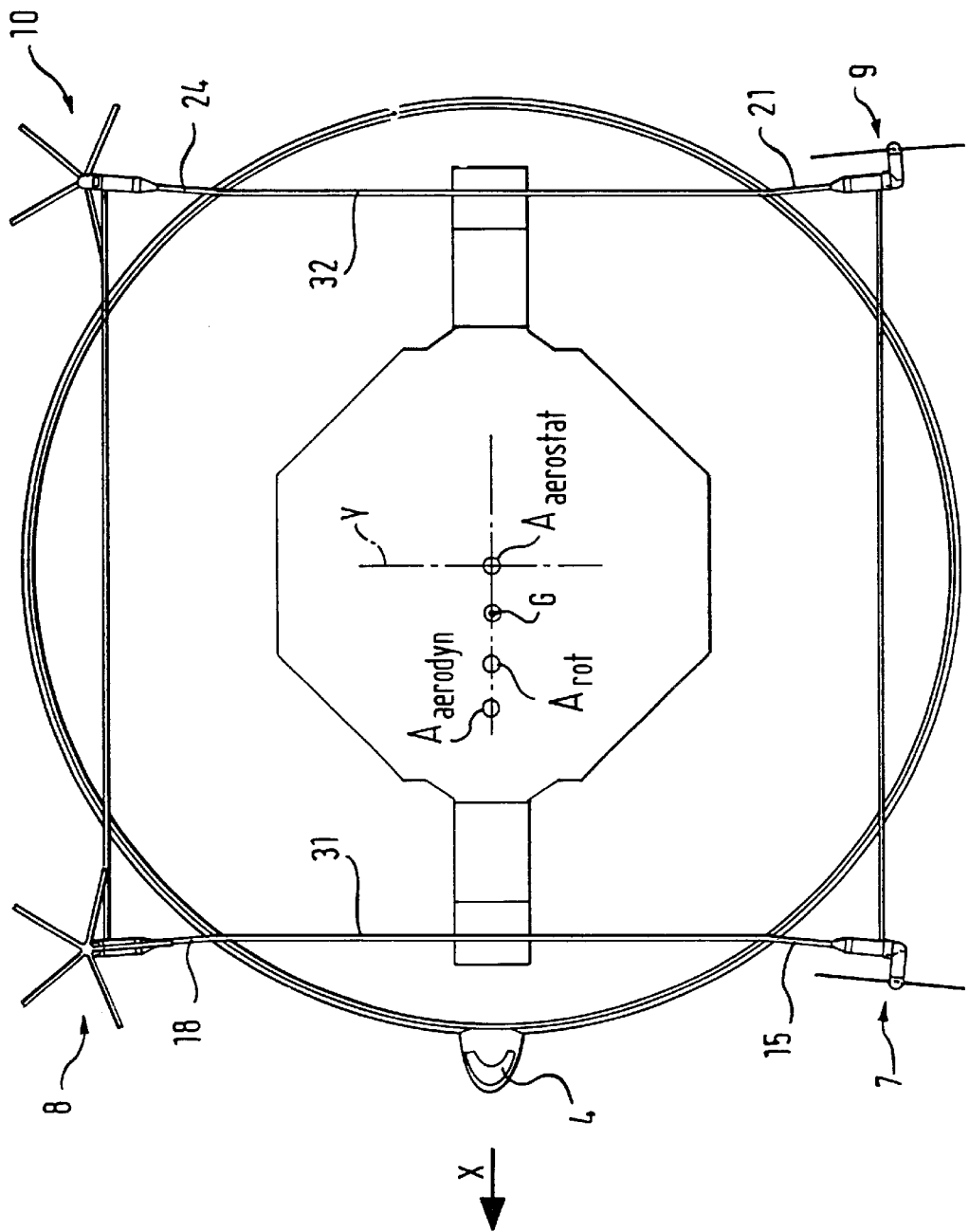
FIG. 6 shows a sectional top view of an aircraft according to the invention in a cargo transport version, with a propulsion support frame for the front and the rear propulsion units.

FIG. 6 illustrates the cargo transport version from FIGS. 4 and 5 once again in a sectional plan view, the front right propulsion unit 8 being shown on the right side, as seen in the direction of flight X, and the rear right propulsion unit 10 being shown in its vertical flight position (with the horizontal propeller plane), and the propulsion units on the left, as seen in the direction of flight, namely the left front propulsion unit 7 and the left rear propulsion unit 9, being illustrated in the cruising position (with a vertical propeller plane). This illustration, with propulsion units tilted differently, serves merely for a clearer understanding; it does not represent a real flying state.

The propulsion units are advantageously arranged in the longitudinal direction, as regards the lift distribution, in such a way that, during vertical take-off, the resultant of the lift center of gravity of all the drive units $A_{rot}$ and of the aerostatic lift of the fuselage volume $A_{aerostat}$ passes through the mass center of gravity G of the aircraft. The mass distribution and the distribution of the aerostatic lift $A_{aerostat}$ are, in this case, advantageously organized in such a way that the mass center of gravity G is in front of the aerostatic lift center. This distance is measure so that, after the failure of all the propulsion units, for example because of a lack of fuel, a gliding flight stable in terms of flight mechanics is established at a preselected low flying speed. FIG. 6 correspondingly indicates the points by way of example, the respective designation $A_{aerodyn}$ indicating the application point of a resultant aerodynamic lift, $A_{aerostat}$ indicating the application point of the aerostatic lift of the fuselage volume, $A_{rot}$ indicating the lift center of gravity of all the propulsion units and G indicating the mass center of gravity of the aircraft.

It is clearly apparent from the illustration of FIG. 6 that the respective transverse links 15, 16; 18, 19; 21, 22; 24, 25, of which only the upper transverse link can be seen in each case, are directed slightly outward relative to the aircraft transverse axis y, from the middle portion of the front supporting structure 31, said middle portion being located within the fuselage, or from the middle portion of the rear supporting structure 32, said middle portion being located within the fuselage, that is to say are angled forward from the front supporting structure 31 and rearward from the rear supporting structure 32. The oblique position, thereby obtained, of the propeller planes during cruising, with respect to a vertical plane through the transverse axis of the aircraft, can also be seen in the side view of FIG. 1. This oblique position ensures that the air flow flowing round the aircraft flows essentially axially onto the propeller when the latter is in its normal position in the cruising state (FIG. 1).

Figure 7:
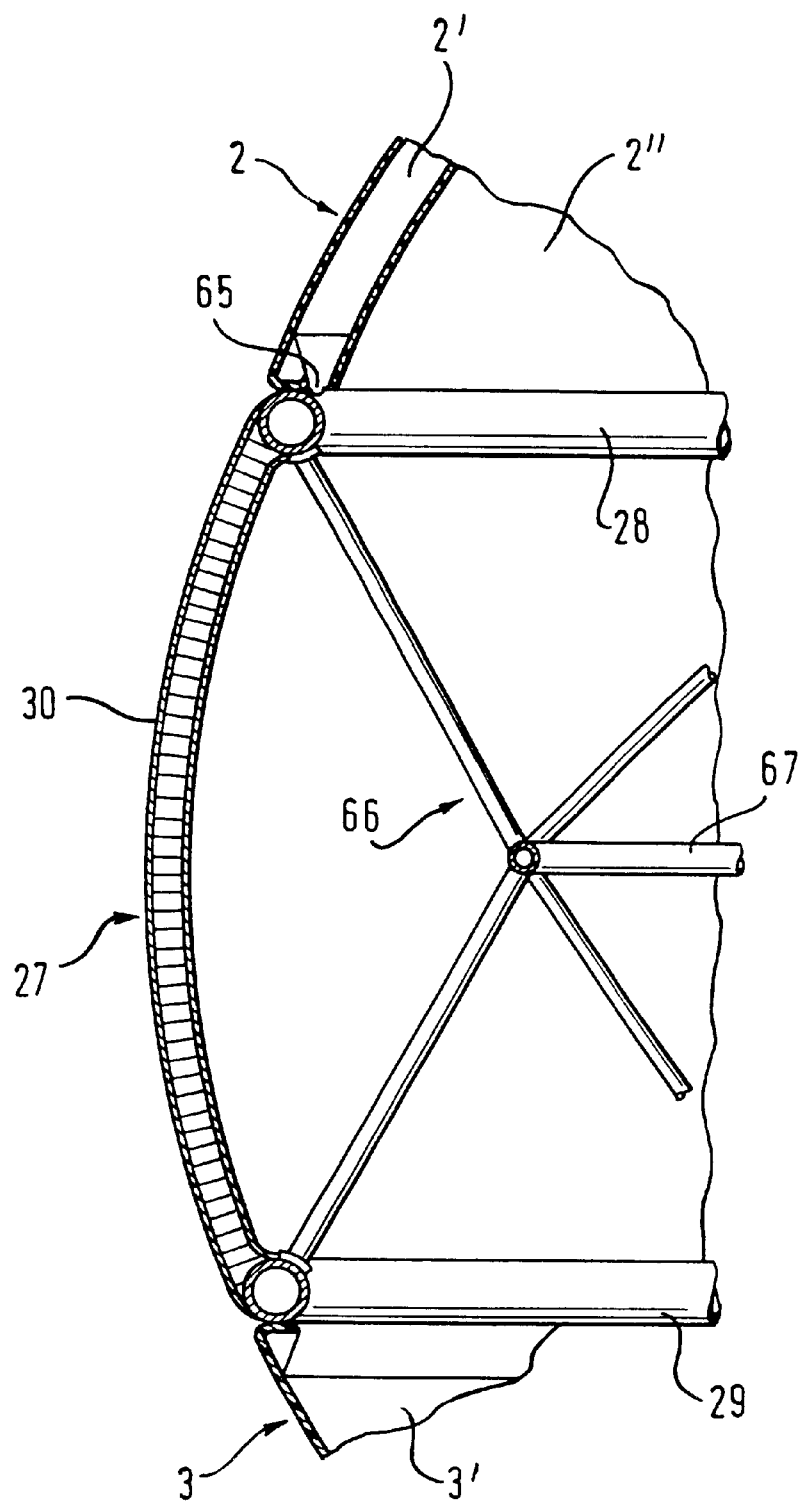
FIG. 7 shows a detail of a partially sectional side view of an aircraft according to the invention with a reinforcing ring and a supporting structure.

FIG. 7 shows a detail of a partially sectional side view of an aircraft according to the invention in the equatorial region. The reinforcing ring 27 has a tubular upper supporting profile 28 and a tubular lower supporting profile 29 which are laminated into a sandwich-like annular wall 30 on the upper circumference and the lower circumference of the latter respectively. The contour of the wall 30 is curved convexly outward in a partelliptic manner. The fuselage envelope 2' of the upper shell 2 and the fuselage envelope 3' of the lower shell 3 are fastened to the upper supporting profile 28 and to the lower supporting profile 29 respectively via suitable fastening devices. For this purpose, the respective supporting profile 28, 29 can have a suitable profiled cross-sectional shape which differs from the circular shape illustrated in FIG. 7. This makes it possible to attach corresponding fastening parts of the respective fuselage envelope 2', 3' to the associated upper supporting profile 28 and to the lower supporting profile 29 respectively.

The fuselage envelope is formed by a suitable flexible material, such as is already used, for example, in airship construction. The terms "upper shell" and "lower shell", chosen in the present application, do not mean that these are rigid structures, but merely designate the geometric shape when the fuselage is in the pressurized state.

The upper shell 2 is of double-walled design, an inner envelope 2" being spaced from the outer envelope 2' and forming a channel, into which open outflow orifices 65 formed in the upper supporting profile 28. The space formed between the outer envelope 2' and the inner envelope 2" may also be subdivided at the meridians into a multiplicity of channels. A central upper outflow orifice, not shown, is provided in the outer envelope 2' at the uppermost point of the upper shell 2. Warm air supplied through the upper supporting profile 28 can thereby flow out of the orifices 65 into the channels formed between the inner envelope 2" and the outer envelope 2' and escape again from the central upper outflow orifice. The warm air heats the outer envelope 2' and therefore making it possible to deice the outer envelope.

FIG. 7 also shows a framework-like supporting skeleton 66 which is located on the radially inner side of the reinforcing ring 27 and which connects the upper supporting profile 28 and the lower supporting profile 29, including an inner annular supporting profile 67. The supporting skeleton 66 serves for strengthening the reinforcing ring 27.

For control purposes, the aircraft designed without conventional aerodynamic control devices has special propulsion units 7, 8, 9, 10 which, by virtue of a specially designed rotor head 110 with an inclining propeller rotation plane 113, allow thrust vector control by means of the propeller.

A rotor head 110 of a propulsion unit of this type and a modification of this are described below with reference to FIGS. 8 and 9.

Figure 8:
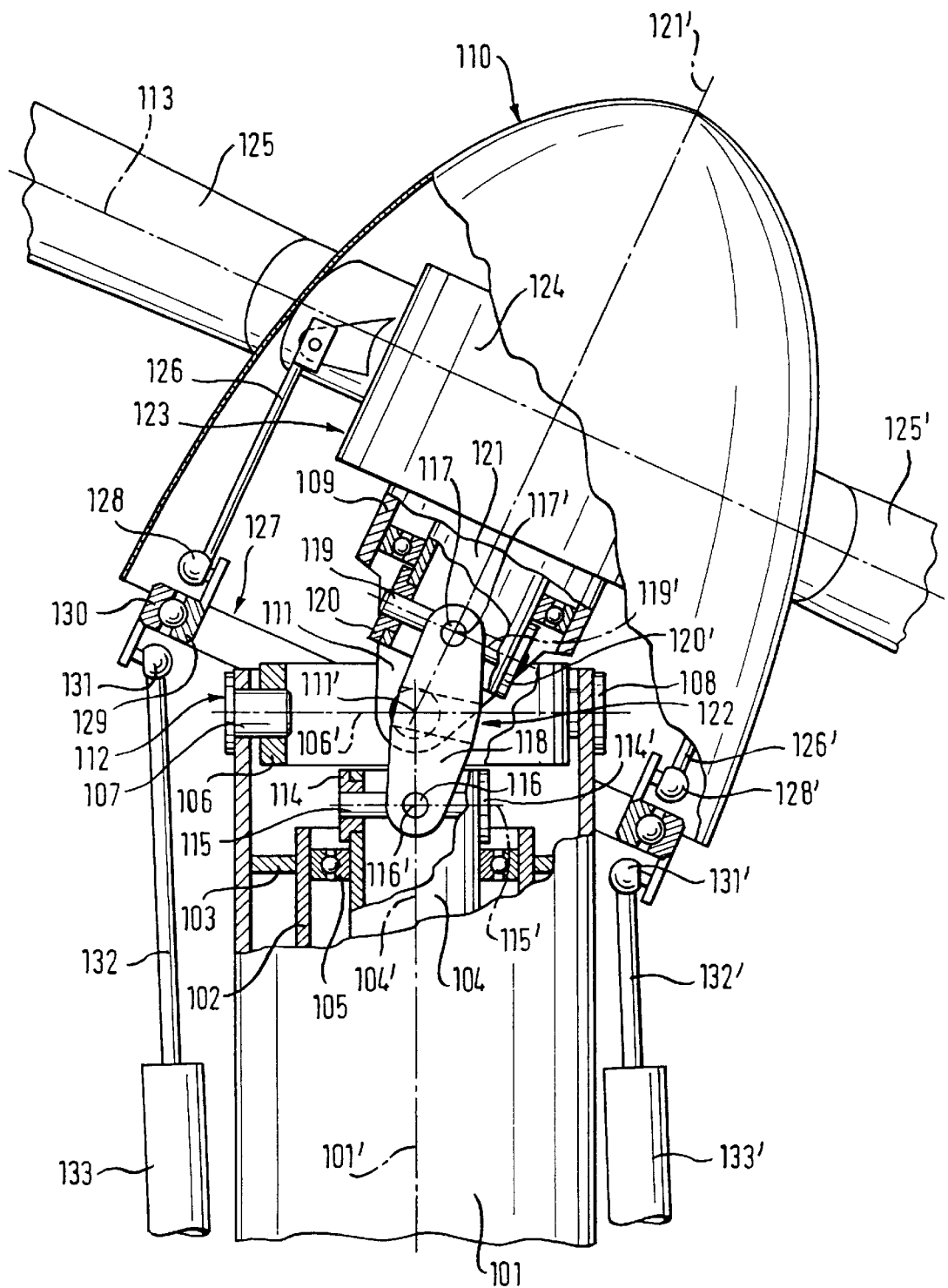
FIG. 8 shows a partially sectional side view of an inclinable propulsion system in a first embodiment; and, FIG. 9 shows a partially sectional side view of an inclinable propulsion system in a second embodiment.

FIG. 8 illustrates a first embodiment of a rotor head according to the invention of one of the propulsion units 7, 8, 9, 10. The rotor head has, in its lower part, as seen in FIG. 8, a hollow-cylindrical front portion 101 of a propeller support structure or drive housing. This portion corresponds to the front portions 53, 54 of the front propulsion units 7, 8 or to the rear portions 55, 56 of the rear propulsion units 9, 10 of the aircraft according to the invention.

Arranged inside the front portion 101 coaxially to this is an inner cylindrical auxiliary carrier tube 102 which is connected to the cylindrical front portion 101 via annular spacers 103.

A shaft 104 is mounted for rotation via bearings 105 within the inner cylindrical auxiliary carrier tube 102 coaxially to the latter. The shaft 104 is the output shaft of one of the engines 49, 50, 51, 52 illustrated diagrammatically in FIG. 2. Said shaft may be arranged coaxially to the rotary shaft of the associated engine or, as in the example of FIGS. 1 to 7, may be connected to the rotary shaft of the engine via an angular gear. Moreover, the shaft 104 may be the output shaft of a reduction gear or gear assembly located downstream of the engine.

At the free end of the cylindrical front portion 101 of the propeller support stricture or drive housing, a cardan ring 106 is mounted to pivot, within the hollow-cylindrical casing of the front portion 101, on said casing. Here, the pivot axis 106' of the cardan ring 106 is at right angles to the longitudinal axis 101' of the cylindrical front portion 101. The cardan ring 106 is mounted on the hollow-cylindrical front portion 101 in a known way via bearing bolts 107, 108.

Within the cardan ring 106, a cylindrical support tube 109 of the propeller hub 110 is mounted to pivot in the cardan ring 106 by means of two bearing plates 111 projecting axially at the lower end of the hollow-cylindrical support tube 109 on two radially opposite sides. The inclination axis 111', about which the bearing plates 111 and consequently the hollow-cylindrical support tube 109 pivot, is perpendicular to the longitudinal axis 109' of the hollow-cylindrical carrier tube 109 and perpendicular to the pivot axis 106' of the cardan ring 106. An outer cardan joint 112 is thereby formed, the center point of which is formed by the intersection point of the axes 101', 106' and 111'. This makes it possible for the propeller plane 113 to be inclined in any desired directions with respect to the longitudinal axis 101' of the front portion 101 of the propeller support stricture or drive housing. This longitudinal axis at the same time forms the axis of rotation 104' of the output shaft 104.

Provided in the region of the free end of the output shaft 104 are two diametrically opposite lower inner pivot bearings 114, 114'. These pivot bearings have mounted an axle 115, which passes diametrically through the output shaft 104 and the pivot axis 115'. This is at right angles to the axis of rotation 104' of the output shaft 104, said axis of rotation itself running coaxially to the longitudinal axis 101' of the front portion 101. In order to form a lower cardan cross, the axle 115 is provided in its center (as seen in the longitudinal direction) with two laterally attached pivot pins 116, the pivot axis 116' of which is at right angles to the pivot axis 115'.

Mounted to pivot on each of the pivot pins 116 is a connecting shaft 118 which extends away from the free end of the hollow output shaft 104. This connecting shaft 118, at its end facing away from the pivot pins 116, is mounted on pivot pins 117, the pivot axis 117' of which runs parallel to the pivot axis 116'. In order to form an upper cardan cross, the pivot pins 117 are attached laterally to and in the center (as seen in the longitudinal direction) of an axle 119, the pivot axis 119' of which runs at right angles to the pivot axis 117'.

The axle 119 is mounted for pivot in two upper inner pivot bearings 120, 120' which are provided in the region of the free end of a propeller shaft 121 so as to pass diametrically through the latter. The axis of rotation 121' of the propeller shaft 121 is perpendicular to the propeller rotation plane 113 and to the pivot axis 119'.

An inner double cardan joint 122 is thereby formed, the joint crosses of which are positioned equidistantly from the center point of the outer cardan joint 112. This ensures that when the propeller rotation plane 113 is inclined, the angles between the axes of rotation of the output shaft 104 and of the connecting shaft 118; and the angles between the axes of rotation of the connecting shaft 118 and the propeller shaft 121 arc in each case of equal size. These equal angles correspond to half the angle of inclination of the propeller rotation plane 113. The double cardan joint installed in this way transmits the rotation of the output shaft 104 to the propeller shaft 121 uniformly in any desired inclined position of the propeller rotation plane 113.

The axis of rotation 121' of the propeller shaft 121 and the axis of rotation 104' of the output shaft 104 intersect in the center of the outer cardan joint 112, that is to say at the intersection point of the pivot axis 106' of the cardan ring 106 and of the inclination axis 111' of the bearing plates 111.

Provided in the propeller hub 110 is a planetary gear 123, the sun wheel of which is connected to the propeller shaft 121 and on the ring gear 124 of which the propeller blades 125 are mounted. The planet wheels of the planetary gear 123 are mounted on a planet carrier connected fixedly in terms of rotation to the cylindrical support tube 109.

The mounting of the propeller blades 125, 125' on the ring gear 124 is designed in such a way that the angles of incidence of the propeller blades 125, 125' are adjustable. For this purpose, each propeller blade 125, 125' is connected in an articulated manner to a swash-plate 127 via an associated upper adjusting rod 126, 126' by means of a respective upper ball joint 128, 128'. The swash-plate 127 consists of an inner bearing ring 129 and of an outer bearing ring 130, the upper ball joints 128, 128' being arranged on the inner bearing ring 129. The plane of the annular swash-plate 127 runs through the center point of the outer cardan joint 112, but it may also be offset toward the propeller hub.

Provided on the outer bearing ring 130 of the swash-plate 127 are lower ball joints 131, 131', on which are mounted lower adjusting rods 132, 132'. These lower adjusting rods, which run along the front portion 101 of the propeller support structure or drive housing. These lower adjusting rods are axially adjustable via associated piston/cylinder units 133, 133'. The piston/cylinder units 133, 133' are arranged outside the front portion 101, but they may also be arranged within the tubular front portion 101 between the latter and the inner cylindrical auxiliary support tube 102.

Utilizing the piston/cylinder units 133/133', the lower adjusting rods 132, 132', the swash-plate 127 and the upper adjusting rods 126, 126', the angle of incidence of each propeller blade 125, 125' be adjusted individually. Additionally, collective adjustment of the angles of incidence of the propeller blades by the amount of a difference in angle of incidence common to all the propeller blades can be carried out via this adjusting mechanism.

Figure 9:
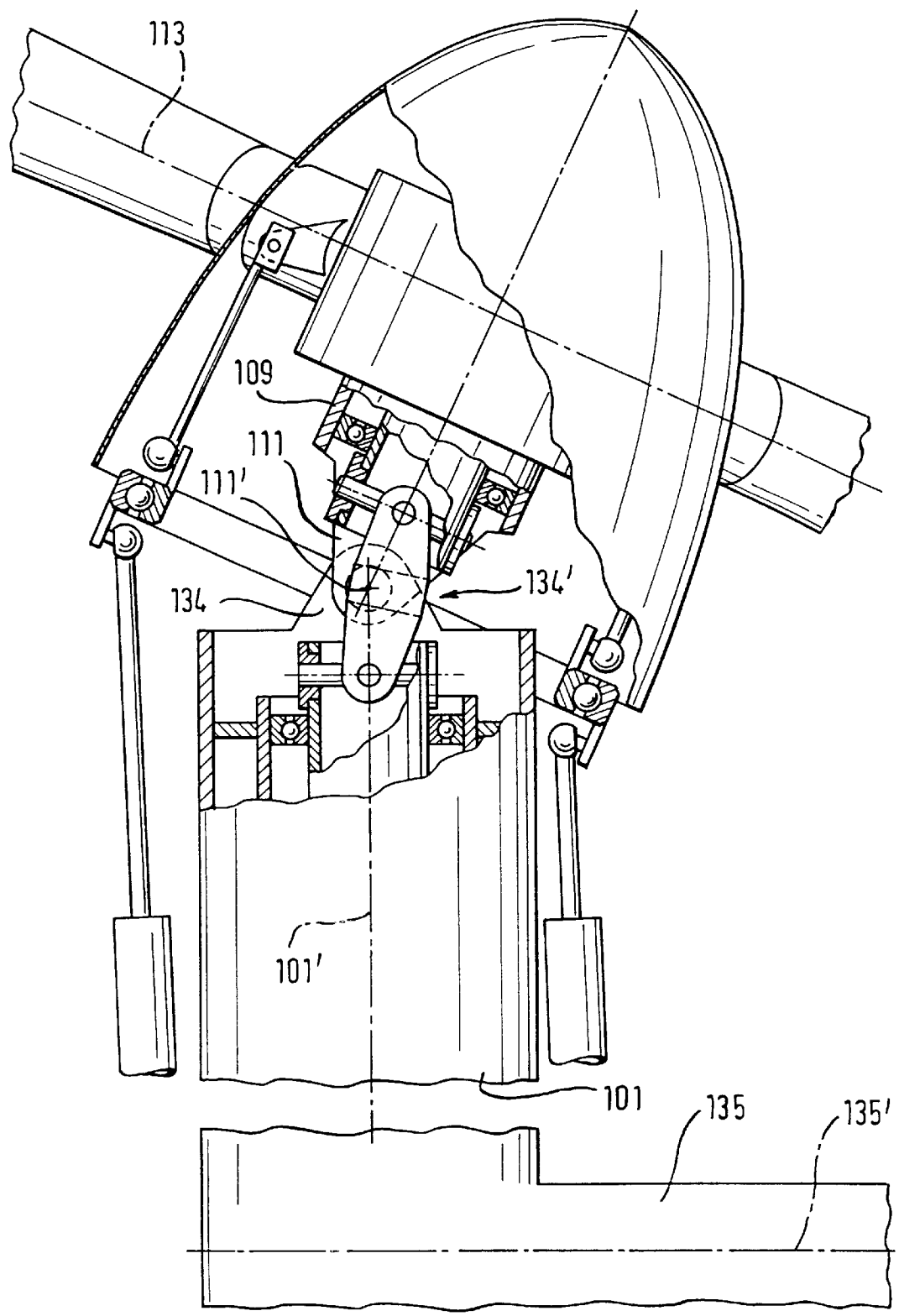

FIG. 9 shows a modification of the rotor head from FIG. 8, in which the outer cardan joint 112 has been replaced by a simple joint which pivots about an axis, as explained below in terms of the differences from the rotor head of FIG. 8.

Provided at the upper free end, in FIG. 9, of the front portion 101 of the propeller support structure or drive housing are lower bearing plates 134. These lower bearing plates project from the end face of the free end of the cylindrical front portion 101 in the longitudinal direction of the front portion. These plates are arranged on two diagonally opposite sides of the front portion 101. The bearing plates 111 of the cylindrical support tube 109 of the propeller hub are mounted to pivot on the lower bearing plates 134, the inclination axis 111' being perpendicular to the longitudinal axis 101' of the front portion 101. An inclination joint 134' is thereby formed. Moreover, the axes 101' and 111 'in each case run at right angles to a tilting axis 135' of a fastening arrangement 135 for fastening the drive device to the aircraft.

Where this rotor head is concerned, the propeller rotation plane 113 may likewise be inclined in any desired direction, since the tilting axis 135' gives the degree of freedom which is given by the pivot axis 106' of the cardan ring 106 in the design according to FIG. 8.

The fastening device 135 tilts about the tilting axis 135' may also be provided in the embodiment, shown in FIG. 8, having the outer cardan joint 112.

The invention is not restricted to the above exemplary embodiment, which serves merely for a general explanation of the essential idea of the invention. On the contrary, within the scope of protection, the device according to the invention may also assume embodiments other than those described above. In this case, the device may, in particular, have features which constitute a combination of the respective individual features of the claims.

Reference symbols in the claims, the description and the drawings serve merely for a clearer understanding of the invention and are not intended to restrict the scope of protection.

What is claimed is:

1. An aircraft comprising:
   a fuselage (1) designed essentially as an aerostatic lift body;
   combined lift and propulsion units (7, 8, 9, 10) each driven by an associated drive device (49, 50, 51, 52), the combined lift and propulsion units articulated on the fuselage (1) each for tilting between a lift position and a propulsion position;
   each combined lift and propulsion units comprising,
      a propeller hub (110) with an axis of rotation;
      the propeller hub (110) being rotatably mounted to a hub support (109);
      a respective propeller shaft (121) for driving the propeller hub (110);
      output shaft (104) of an associated drive device (49, 50, 51, 52) for driving the propeller shaft (121);
      propellers (11, 12, 13, 14) attached to the propeller hub for rotation with the propeller hub in a respective propeller rotation plane (113) essentially perpendicular to the axis of rotation of the respective propeller hub (110);
   each combined lift and propulsion units in the lift position having the respective propeller rotation plane (113) essentially horizontal and an output shaft (104) acting on the respective propeller shaft (121) is essentially vertical;
   each combined lift and propulsion units in the propulsion position having the respective propeller rotation plane (113) essentially vertical and the output shaft (104) acting on the respective propeller shaft (121), is essentially horizontal;
   the propeller hub support (109) connected to the associated drive device (49, 50, 51, 52) in an articulated manner in such a way that the propeller hub (110) freely inclines in roll and pitch relative to the associated drive device (49, 50, 51, 52) independent of movement of the output shaft (104) between the lift position and the propulsion position,
   the propeller shaft (121) and the drive output shaft (104) acting on the propeller shaft (121) connected to one another in an articulated manner in such a way that the propeller shaft (121) rotates uniformly with the output shaft (104), and
   the angle of incidence of each propeller blade being cyclically variable with respect to the angle of rotation of the propeller hub on an individual basis for each propeller blade during hub rotation.

2. The aircraft as claimed in claim 1, wherein the fuselage (1) is designed at the same time as an aerodynamic lift body.

3. The aircraft as claimed in claim 1, wherein aircraft control occurs exclusively by thrust vector.

4. The aircraft as claimed in claim 1, wherein the fuselage (1) has an essentially circular plan.

5. The aircraft as claimed in claim 4, wherein the fuselage (1) has an essentially elliptic cross section.

6. The aircraft as claimed in claim 1, wherein the fuselage cross section has an asymmetric design which is determined essentially by an upper and a lower semiellipse, the upper part forming an upper shell (2) which is curved to a greater extent than the flatter lower part forming a lower shell (3).

7. The aircraft as claimed in claim 1, wherein the fuselage (1) has at least one rim-like reinforcing ring (27) in the equatorial region.

8. The aircraft as claimed in claim 7, wherein the reinforcing ring (27) has, in cross section, a part-elliptic shape on its outer circumference.

9. The aircraft as claimed in claim 7, wherein the reinforcing ring (27) has a composite fiber material of the sandwich type.

10. The aircraft as claimed in claim 7, wherein compression-resistant supporting profiles (28, 29) are integrated into the reinforcing ring (27).

11. The aircraft as claimed in claim 7, wherein the reinforcing ring (27) has at least one supporting skeleton (66) which, in cross section, is of essentially triangular design.

12. The aircraft as claimed in claim 11, wherein the supporting skeleton (26) is at least partially integrated into the reinforcing ring (27).

13. The aircraft as claimed in claim 1, wherein, in each case, two propulsion units (7, 8, 9, 10) are jointly mounted on a supporting structure (31, 32) attached non-rigidly to the fuselage (1).

14. The aircraft as claimed in claim 13, wherein the propulsion units (7, 8, 9, 10) and/or their supporting structures (31, 32) are coupled non-rigidly to one another via thrust struts (36, 37) to form a propulsion support frame (35; 64).

15. The aircraft as claimed in claim 13, wherein the propulsion units (7, 8, 9, 10) and/or their supporting structures (31, 32) are attached nonrigidly to the rim-like reinforcing ring (27) via the propulsion support frame (35, 64).

16. The aircraft as claimed in claim 13, wherein the front propulsion units (7, 8) and the rear propulsion units (9, 10) are in each case at a different distance from the longitudinal center plane of the aircraft.

17. The aircraft as claimed in claim 13, wherein the front propulsion units (7, 8) and the rear propulsion units (9, 10) are in each case arranged at different heights on the aircraft.

18. The aircraft as claimed in claims 13, wherein at least four propulsion units (7, 8, 9, 10) are provided.

19. The aircraft as claimed in claim 1, wherein two engines capable of being operated in parallel with another are provided in each propulsion unit (7, 8, 9, 10).

20. The aircraft as claimed in claim 1, wherein a cargo compartment (58) is designed in the lower region of the fuselage (1).

21. The aircraft as claimed in claim 20, wherein the cargo compartment (58) is provided with at least one ramp.

22. The aircraft as claimed in claim 20, wherein a downwardly directed bellows-like annular bead (59), which is designed to be pneumatically extendable, is provided as a landing foot below the cargo compartment (58) in the region of the circumference of the latter.

23. The aircraft as claimed in claim 1, wherein a passenger cabin (38) having a two-story design in places is provided in the front part of the equatorial region of the fuselage (1).

24. The aircraft as claimed in claim 23, wherein the passenger cabin (38) is suspended in the rim-like reinforcing ring (27).

25. The aircraft as claimed in claim 23, wherein a baggage and freight compartment (39) is provided in the rear part of the equatorial region of the fuselage (1).

26. The aircraft as claimed in claim 25, wherein the baggage and freight compartment (39) is suspended in the rim-like reinforcing ring (27).

27. The aircraft of claim 23, wherein there is provided in the lower shell (3) a central body (42) which is integrated into the latter and on the underside of which a bellows-like pneumatically extendable annular bead (57) is designed as a landing foot (43).

28. The aircraft as claimed in claim 27, wherein the central body (42) is suspended in the envelope structure of the fuselage (1), said envelope structure being formed by the upper shell (2) and by the lower shell (3), in such a way that, in the event of a hard landing, said central body can spring upward and thus makes it possible to cushion the passenger cabin (38), and baggage and freight compartment (39) and propulsion support frame (35).

29. The aircraft as claimed in claim 27, wherein the central body (42) is provided with at least one ramp (48) for access from outside.

30. The aircraft as claimed in claim 23, wherein the passenger cabin (38) and the baggage and freight compartment (39) are connected non-rigidly, via encased transport links (44, 45, 46), to the central body (42) in order to make it possible for the latter to exert a springing action.

31. The aircraft as claimed in claim 1, wherein the fuselage (1) has a support structure and a fuselage envelope (2', 3'), and wherein the fuselage envelope (2') is heated in the region of the upper shell (2).

32. The aircraft as claimed in claim 31, wherein the heated portions of the fuselage envelope (2') are of double-walled (2', 2") design and have flowing through them, warm gas which is warmer than the fuselage surroundings.

33. The aircraft as claimed in claim 1, wherein central control is provided for the individual and collective control of the angles of incidence of the propeller blades (11', 12', 13', 14') of all the propulsion units (7, 8, 9, 10) for flight attitude control and flight control in the vertical take-off and landing mode, in the horizontal cruising mode and in the transitional mode between these two operating states.

34. The aircraft as claimed in claim 33, wherein manual flight control is additionally provided.

35. A method for controlling a propeller driven aircraft in all flight phases, wherein
providing a fuselage (1);
providing propulsion units (7, 8, 9, 10) each driven by an associated drive device (49, 50, 51, 52);
each propulsion unit comprising,
a propeller hub (110) with an axis of rotation;
the propeller hub (110) being rotatably mounted to a hub support (109);
a respective propeller shaft (121) for driving the propeller hub (110);
an output shaft (104) of an associated drive device (49, 50, 51, 52) for driving the propeller shaft (121);
propellers (11, 12, 13, 14) attached to the propeller hub for rotation with the propeller hub in a respective propeller rotation plane (113) essentially perpendicular to the axis of rotation of the respective propeller hub (110);
providing each propeller hub support (109) connected to the associated drive device (49, 50, 51, 52) in an articulated manner in such a way that the propeller hub (110) freely inclines in roll and pitch relative to the associated drive device (49, 50, 51, 52);
providing each propeller shaft (121) and each drive output shaft (104) acting on the associated propeller shaft (121) connected to one another in an articulated manner in such a way that the propeller shaft (121) rotates uniformly with the output shaft (104),
providing the angle of incidence of each propeller blade being cyclically variable with respect to the angle of rotation of the propeller hub on an individual basis for each propeller blade during hub rotation; and,
setting the angle of incidence of the individual propeller blades (125, 125') of each propeller cyclically individually, and,
individually inclining the propeller rotation planes (113) without any reaction force, said inclination being induced by aerodynamic forces and centrifugal forces resulting from these, with respect to the output shaft (104) acting on the propeller shaft (121), in order to influence the direction of a thrust vector at each propulsion unit (7, 8, 9, 10) for the control of the aircraft.

36. An aircraft comprising:
a fuselage (1) designed essentially as an aerostatic lift body;
combined lift and propulsion units (7, 8, 9, 10) each driven by an associated drive device (49, 50, 51, 52); the combined lift and propulsion units articulated on the fuselage (1) each for tilting between a lift position and a propulsion position;
each combined lift and propulsion units comprising,
a propeller hub (110) with an axis of rotation;
the propeller hub (110) being rotatably mounted to a hub support (109);
a respective propeller shaft (121) for driving the propeller hub (110);
an output shaft (104) of an associated drive device (49, 50, 51, 52) for driving the propeller shaft (121);
propellers (11, 12, 13, 14) attached to the propeller hub for rotation with the propeller hub in a respective propeller rotation plane (113) essentially perpendicular to the axis of rotation of the respective propeller hub (110);
each combined lift and propulsion units in the lift position having the respective propeller rotation plane (113) essentially horizontal and an output shaft (104) acting on the respective propeller shaft (121) is essentially vertical with the angle of incidence of each propeller blade being cyclically variable individually when in the lift position;
each combined lift and propulsion units in the propulsion position having the respective propeller rotation plane (113) essentially vertical and the output shaft (104)

acting on the respective propeller shaft (121), is essentially horizontal with the angle of incidence of each propeller blade being cyclically variable individually when in the propulsion position;

the propeller hub support (109) connected to the associated drive device (49, 50, 51, 52) in an articulated manner in such a way that the propeller hub (110) freely inclines in roll and pitch relative to the associated drive device (49, 50, 51, 52) independent of movement of the output shaft (104) between the lift position and the propulsion position;

the propeller shaft (121) and the drive output shaft (104) acting on the propeller shaft (121) connected to one another in an articulated manner in such a way that the propeller shaft (121) rotates uniformly with the output shaft (104); and, the angle of incidence of each propeller blade being cyclically variable with respect to the angle of rotation of the propeller hub on an individual basis for each propeller blade during hub rotation.

37. An aircraft as claimed in claim 36, wherein the propeller hub support is mounted with a cardan like joint with respect to the drive devices (49, 50, 51, 52) in order to uncouple the transmission of torque from the transmission of all translation forces generated by the drive units.

* * * * *